United States Patent
Eriksson et al.

(10) Patent No.: US 7,949,452 B2
(45) Date of Patent: May 24, 2011

(54) OPTIMIZING SHIFT STRATEGIES THROUGH DRIVING SIMULATION

(75) Inventors: Anders Eriksson, Goteborg (SE); Marcus Steen, Angered (SE)

(73) Assignee: Volvo Lastvagnar AB, Gothenburg (SE)

( * ) Notice: Subject to any disclaimer, the term of this patent is extended or adjusted under 35 U.S.C. 154(b) by 75 days.

(21) Appl. No.: 11/878,046

(22) Filed: Jul. 20, 2007

(65) Prior Publication Data

US 2008/0027612 A1 Jan. 31, 2008

Related U.S. Application Data

(62) Division of application No. 10/494,464, filed as application No. PCT/SE02/01970 on Oct. 30, 2002, now abandoned.

(30) Foreign Application Priority Data

Oct. 31, 2001 (SE) .................................... 0103629

(51) Int. Cl.
*G06F 7/00* (2006.01)
(52) U.S. Cl. ........................................ 701/55; 701/56
(58) Field of Classification Search ................... 701/54, 701/55, 201, 56
See application file for complete search history.

(56) References Cited

U.S. PATENT DOCUMENTS

| | | | | |
|---|---|---|---|---|
| 4,947,331 | A * | 8/1990 | Speranza ........................ | 701/55 |
| 5,832,400 | A * | 11/1998 | Takahashi et al. .............. | 701/53 |
| 5,931,886 | A * | 8/1999 | Moroto et al. .................. | 701/54 |
| 5,983,154 | A * | 11/1999 | Morisawa ....................... | 701/56 |
| 6,016,457 | A * | 1/2000 | Toukura et al. ................. | 701/70 |
| 6,029,107 | A * | 2/2000 | Sato ................................ | 701/58 |
| 6,098,005 | A * | 8/2000 | Tsukamoto et al. ........... | 701/65 |
| 6,149,545 | A * | 11/2000 | Genise et al. ................. | 477/124 |
| 6,244,986 | B1 * | 6/2001 | Mori et al. ..................... | 477/46 |
| 6,272,415 | B1 * | 8/2001 | Tanaka et al. .................. | 701/54 |
| 6,275,760 | B1 * | 8/2001 | Saito et al. ..................... | 701/55 |
| 6,304,812 | B1 * | 10/2001 | Kolmanovsky et al. ...... | 701/103 |
| 6,356,831 | B1 * | 3/2002 | Michelini et al. .............. | 701/56 |
| 2001/0032044 | A1 * | 10/2001 | Hanawa et al. ................ | 701/51 |
| 2001/0044359 | A1 * | 11/2001 | Saito et al. ..................... | 477/92 |
| 2002/0042672 | A1 * | 4/2002 | Shiiba et al. ................... | 701/65 |
| 2003/0143957 | A1 * | 7/2003 | Lyon ............................ | 455/67.1 |

FOREIGN PATENT DOCUMENTS

EP 924448 A2 * 6/1999
* cited by examiner

*Primary Examiner* — Mark Hellner
(74) *Attorney, Agent, or Firm* — Novak Druce + Quigg LLP

(57) ABSTRACT

A motor vehicle includes a clutch and an automated transmission between the engine and the drive wheels of the vehicle. A method for shift control in the motor vehicle when starting off or under way includes continuously performing computer simulations of the future driving of the vehicle, at least in response to information on road incline and throttle opening position, for a set of different shift schedules with combinations of engine speeds when shifting and shift steps, and selecting a shift schedule from the set of shift schedules which is optimal with regard to a selected criterion.

14 Claims, 4 Drawing Sheets

OPTIMIZING SHIFT STRATEGIES THROUGH DRIVING SIMULATION

Figure 1:
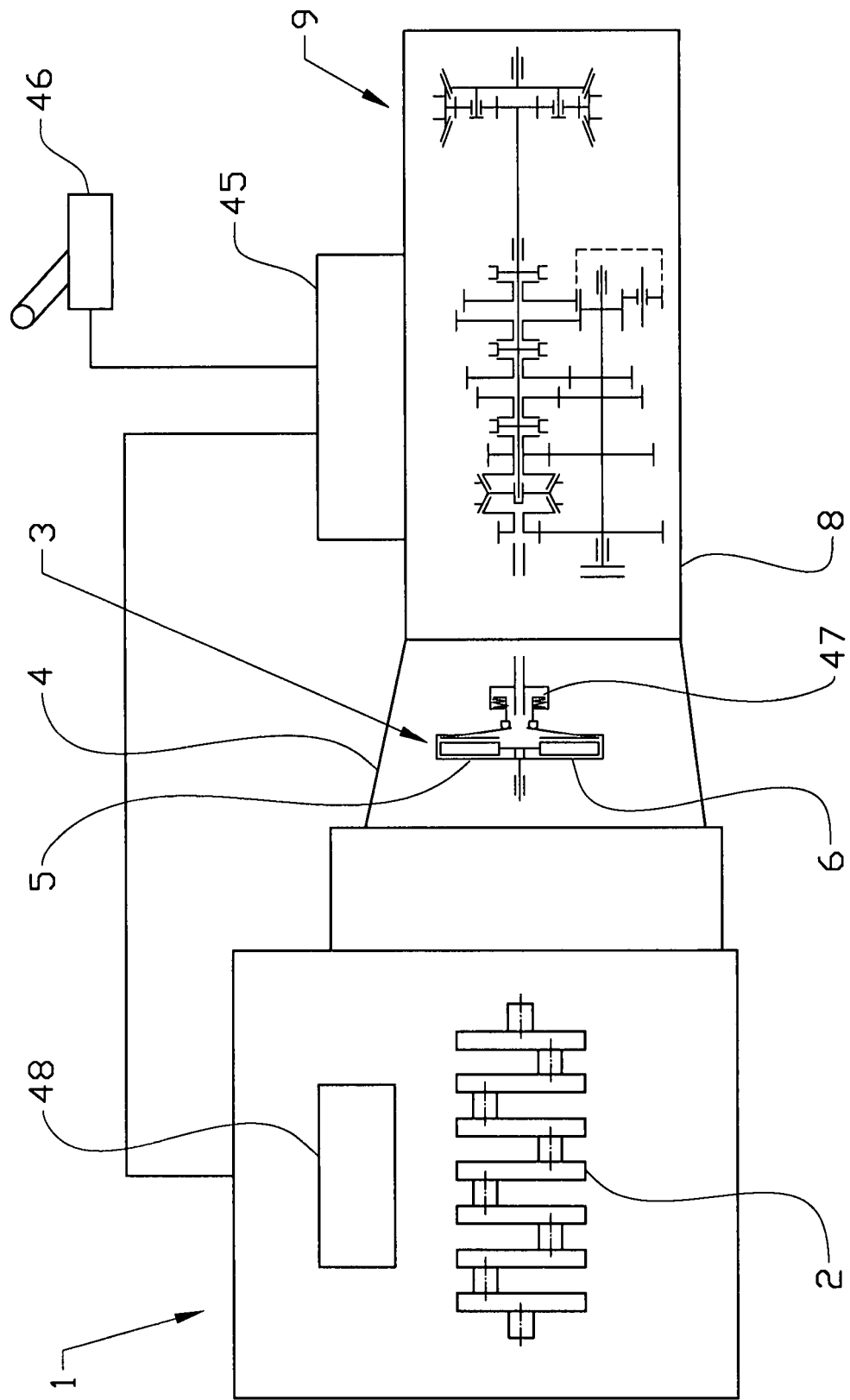

The present invention relates to motor vehicle with a clutch and automated transmission between the engine and the drive wheels of the vehicle, comprising a first electronic control unit for controlling the engine, a second electronic control unit for controlling the transmission in accordance with a selected position for an electronic gear selector where the second control unit with the gear selector in the position for automatic shifting, when starting off or under way, selects a gear which is determined by a gear selection strategy stored in the second control unit as a function of various parameters fed into the second control unit, In vehicles of this type there are today control units with a stored gear selector strategy, i.e, a time-based shifting sequence as a function of road incline, for example. A known technology is described in US-A-5 832 400. For vehicles with a conventional automatic transmission, where the transmission shifts sequentially with a torque converter, there is a gear selection strategy based on an algorithm which takes into account a measuring point in the topography surrounding the vehicle with instantaneous vehicle position as a reference point. By determining, by various methods, where the vehicle will be after a certain time interval, it is possible to modify the engine setting and the shifting points for the automatic transmission, i.e, at which rpm the transmission should shift up or down. Possible variants could be to use electronic maps together with a positioning system (e.g, a Global Positioning System, GPS) or extrapolate a future position for the vehicle. One disadvantage of this system is that it does not take into consideration how the road varies in elevation between two points of measurement, and extreme points (e.g, the crest of a hill) between the two points of measurement are thus not taken into account in certain cases. The engine and the transmission are set in accordance with the known technology, on the basis of how great the difference in elevation is between the two points of measurement, and the instantaneous throttle position. Throttle position means in this case and in the following text both an adjustable cruise control and an accelerator pedal.

U.S. Pat. No. 5,832,400 only takes into consideration, as was mentioned, a single point of measurement during a certain time or distance into the future, in order to see if the instantaneous engine torque will be sufficient, or if the engine and/or transmission needs to be reset. It is also described how a plurality of points of measurement can be used but in that case a mean value thereof is used, thus providing one value for the required driving force. With a transmission which is shifted sequentially and with the method just described, there is an uncertainty in the system which results in tangible consequences in the form of less than satisfactory cruise control function, uneven acceleration and unnecessarily large exhaust emissions.

The purpose of the present invention is to achieve a motor vehicle of the type described by way of introduction, which avoids the above mentioned problems by not compromising with a limited gear selection strategy, but rather reaches a decision about gear ratio with much better input, considering the future.

This is achieved according to the invention by virtue of the fact that one of the control units is disposed, when starting off or underway, 1) to continuously perform computer simulations, at least in response to information on road incline and throttle opening position, of the future driving of the vehicle for a set of different combinations of engine speeds when shifting and shift increments in accordance with a driving-related criterion selected by a control; and 2) to select at that time a tailored or customized shifting strategy which will be optimal for the particular stretch of road being driven and for which the simulation is being conducted in view of the selected criterion. Thus, the invention permits a number of different shifting strategies to be tested or "gamed out" in such simulations such that the shifting strategy that is optimal for the upcoming driving conditions can be selected, where optimization is with respect to the selected driving-related criterion and each such strategy includes one or more combinations of engine speed and from/to gear-shift sequence.

Furthermore, the control unit selects a drive line gear ratio which results in lower emissions than what is achieved with known technology for the given stretch of road.

In a preferred embodiment, the second control unit is disposed, under set preconditions, to lay out a shifting schedule with automatic gear selection for a longer period forward (30 seconds or more), where the information on instantaneous position is obtained with the aid of GPS and/or where future positions are provided by information from an electronic map. The driver can himself select the criterion for driving, i.e. choose the relative weights of the controlling parameters. Controlling parameters include emissions, average speed or fuel consumption. If the drive, for example, prefers an optimized, economic driving model with low fuel consumption, the first weight is given to fuel consumption and the computer simulation will produce, for the given control parameter weighting, the most energy-saving shifting schedule. Furthermore, compromise solutions can be selected by giving the desired weightings for the respective control parameters. In order to provide additional precision in the simulation result, consideration is taken to the individual variations of the individual engine, since emissions from the engine can be measured when driving in various driving situations and these can be taken into consideration for future engine settings. Settings for the engine, for example, can vary along an imagined road picture, which the simulation is made for, in contrast to the known technology, where the engine setting has only two positions between an instantaneous position and a future position. The engine model is also important for providing information on engine exhaust emissions at various transients. Present known technology does not facilitate taking this into account. And shifting in the gearbox does not need to be done sequentially. The computer also simulates shifting sequences where one or more gears are skipped.

The present invention, according to a first embodiment which uses GPS and electronic maps, can make simulations which are valid relatively far into the future, but the risk of something unforeseen, i.e. about which information cannot be gotten from the electronic map, will consequently increase. The system has a sensibility, which, with the aid of extrapolation of the throttle opening position, can to a certain extent estimate in what position the throttle opening will be in a few seconds and how rapidly it is expected to move towards that position. This means that the system can adjust to a new situation earlier than known systems, which only consider the instantaneous throttle opening position.

In a second embodiment, with the aid of electronics and sensors, estimates (extrapolations) can be made concerning road incline and information can thus be obtained on the topography surrounding the vehicle and its future position. In both embodiments, it is possible according to the present invention to use information on surrounding vehicles in order to be able to obtain a lower fuel consumption in a situation, for example, where one will catch up to a vehicle driving in front.

The present invention is preferably intended for, but is not limited to, automated manual transmissions. A significant difference in relation to the known technology (Automated Power Transmission) referred to, is that shifting in the present case takes place with force interruption. There is thus a clear advantage of using the system according to the invention, otherwise it is not certain that shifting up in an uphill incline will be successful, even if the driving force were theoretically sufficient because if the shifting takes too long, the vehicle will be retarded too much.

In the above description and in the following, it is stated that the various input data are fed into the second control unit which carries out the computer simulations. This function can, of course, also be taken over by the first control unit or in another physical location arranged for communication with the second control unit.

Figure 2:
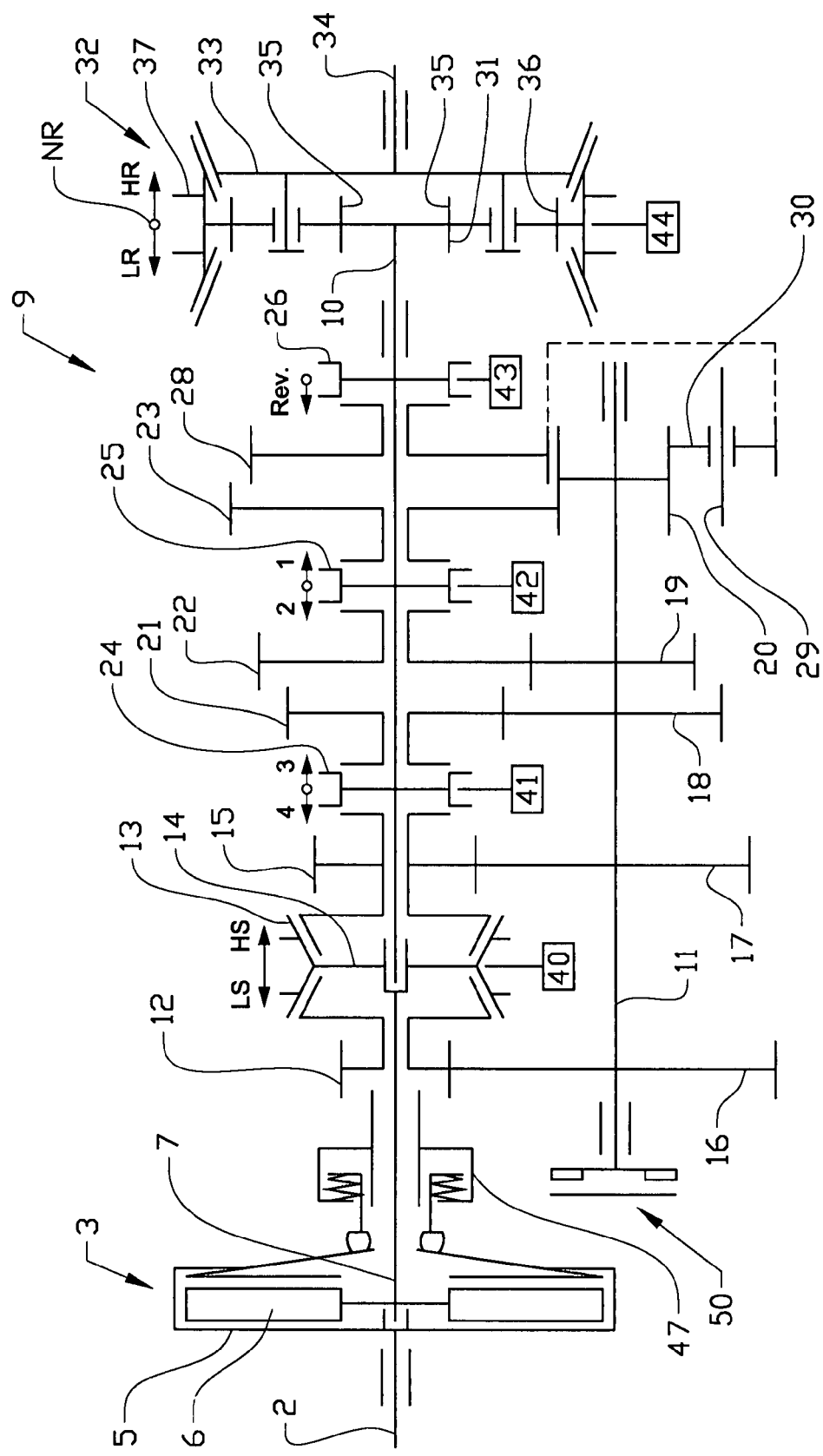
Figure 3:
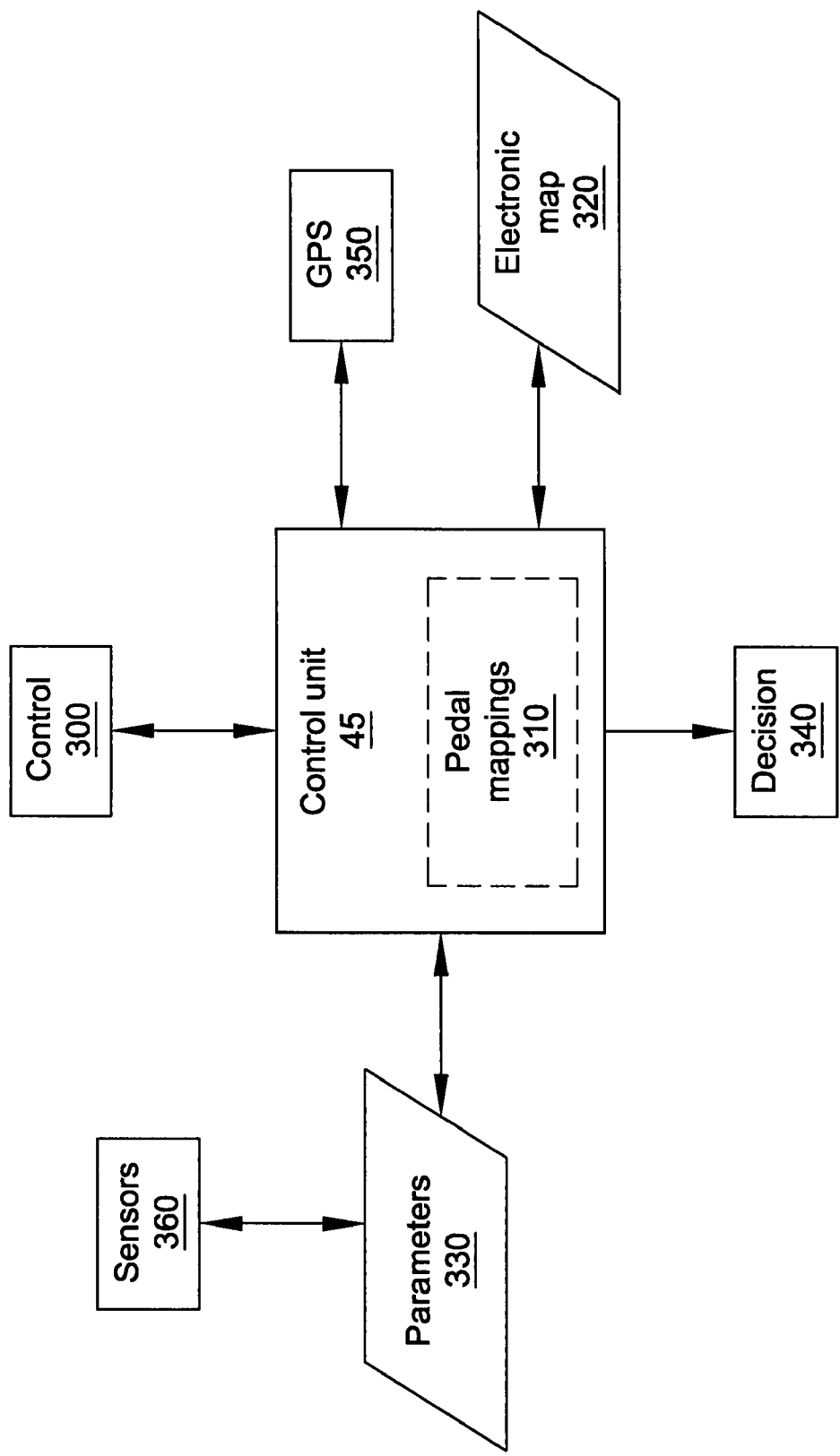

The invention will be described in more detail below with reference to examples shown in the accompanying drawings, where FIG. 1 shows a schematic representation of the embodiment of a drive unit according to the invention, FIG. 2 shows the clutch and the gearbox in FIG. 1 on a larger scale, and FIG. 3 shows an overview of inputs into the second control unit.

Figure 4:
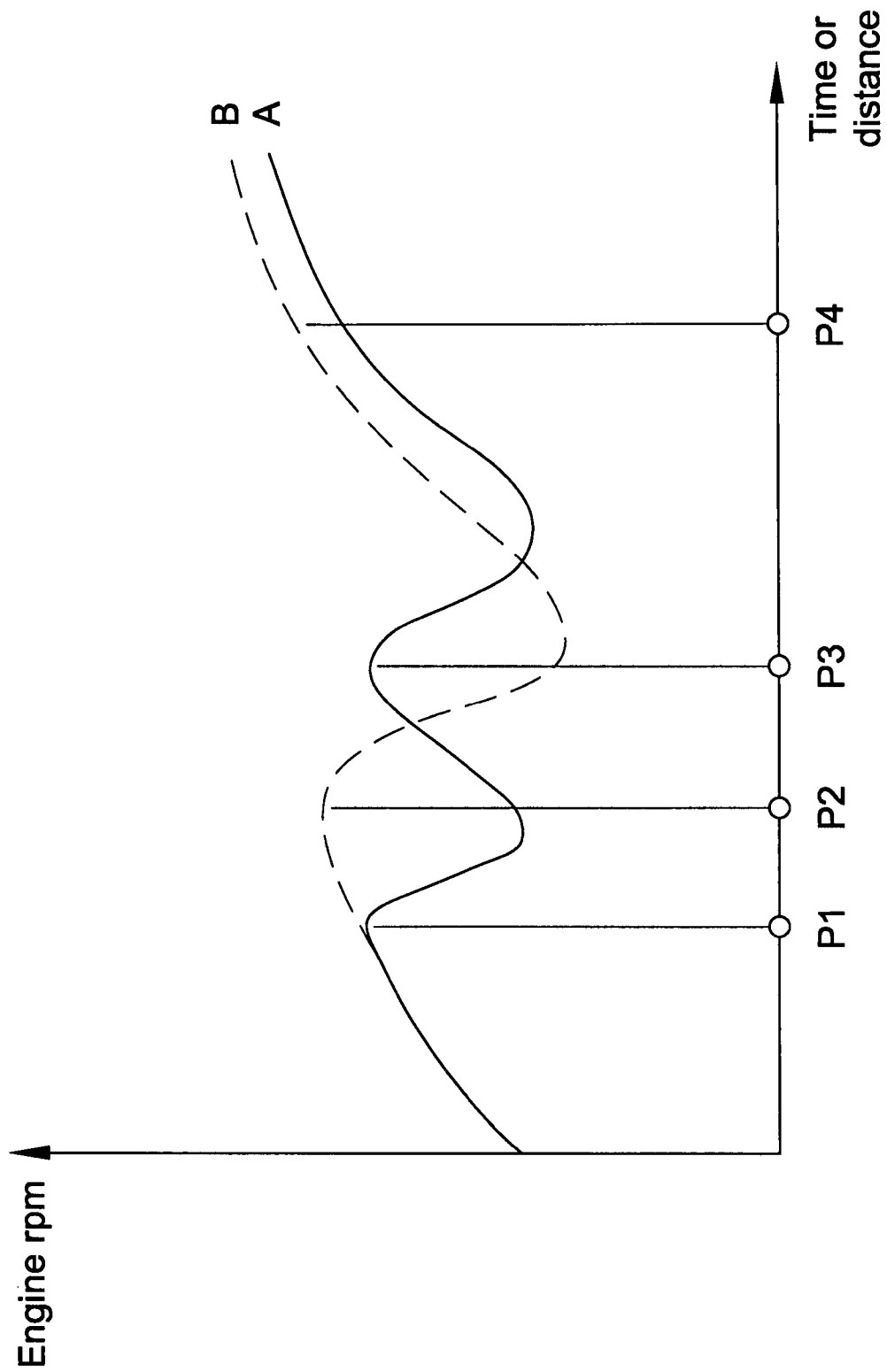

FIG. 4 exemplifies parts of a simple computer simulation.

In FIG. 1, 1 designates a six-cylinder internal combustion engine, e.g. a diesel engine, the crankshaft 2 of which is coupled to a single-plate dry disk clutch which is designated generally by reference number 3 and is enclosed in a clutch case 4. Instead of a single-plate disk clutch, a dual disk clutch can be used. The crankshaft 2 is connected non-rotatably to the clutch housing 5 of the clutch 3, while its disk plate 6 is connected non-rotatably to an input shaft 7, which is mounted rotatably in the casing 8 of a gearbox designated generally by reference number 9. A main shaft 10 and an intermediate shaft 11 are also mounted rotatably in the casing 8. Further, there are illustrated a first control unit 48 for controlling the engine, a second control unit for controlling the transmission and a manual gear-speed selector 46, coupled to the second control unit 45. The first and second control units (48 and 45, respectively) are adapted for communication with each other.

As can be seen most clearly from FIG. 2, a gear wheel 12 is mounted rotatably on the input shaft 7 and is lockable on the shaft by means of an engaging sleeve 13 which is provided with synchronizing means and is mounted non-rotatably but axially displaceably on a hub 14 connected non-rotatably to the input shaft 7. By means of the engaging sleeve 13, a gear wheel 15 mounted rotatably on the main shaft 10 is also lockable relative to the input shaft 7. The gear wheels 12 and 15 engage with gear wheels 16 and 17, respectively, which are connected non-rotatably to the intermediate shaft 11. Arranged in a rotationally fixed manner on the intermediate shaft 11 are further gear wheels 18, 19 and 20 which engage with gear wheels 21, 22 and 23, respectively, which are mounted rotatably on the main shaft 10 and are lockable on the main shaft by means of engaging sleeves 24 and 25, respectively, which, in the illustrative embodiment shown, do not have synchronizing arrangements. A further gear wheel 28 is mounted rotatably on the main shaft 10 and engages with an intermediate gear wheel 30, which is mounted rotatably on a separate shaft 29 and engages in turn the intermediate shaft gear wheel 20. The gear wheel 28 is lockable on its shaft by means of an engaging sleeve 26.

The gear wheel pairs 12, 16 and 15, 17 and also the engaging sleeve 13 form a split gearing with a low gear stage LS and a high gear stage HS. The gear wheel pair 15, 17 also forms, together with the gear wheel pairs 21, 18, 22, 19, 23, 20 and 28, 30, a basic gearbox with four forward gears and one reverse gear. Arranged in a rotationally fixed manner on the output end of the main shaft is a gear wheel 31 which forms the sun gear in a two-stage range gear of the planetary type designated by reference number 32, the planet wheel carrier 33 of which is connected in a rotationally fixed manner to a shaft 34 which forms the output shaft of the gearbox. The planet wheels 35 of the range gear 32 engage with a ring gear 36, which, by means of an engaging sleeve 37, is lockable relative to the gearbox casing 8 for low range LR and relative to the planet wheel carrier 33 for high range HR. The engaging sleeve also has a neutral position NR between the gear positions LR and HR. In the neutral position NR the output shaft 34 is released from the main shaft 10.

The engaging sleeves 13, 24, 25, 26 and 37 are displaceable as shown by the arrows in FIG. 2, to provide the gear stages shown next to the arrows. The displacement is brought about by servo devices 40, 41, 42, 43 and 44 which are indicated diagrammatically in FIG. 2 and may be pneumatically operated piston/cylinder arrangements of the type used in a gearbox of the type described above, which is marketed under the name Geartronic®. The servo devices are controlled by an electronic control unit 45 (FIG. 1), comprising a microcomputer, depending on signals fed into the control unit representing the various engine and vehicle data which comprise at least engine speed, vehicle speed, throttle pedal position and, in this case, engine brake on/off, when an electronic gear selector 46 coupled to the control unit 45 is in its automatic transmission position. When the selector is in the position for manual shifting, shifting is effected via the gear selector 46 at the command of the driver. The control unit 45 also controls fuel injection, that is to say the engine speed, depending on the throttle pedal position, and also the air supply to a pneumatic piston/cylinder arrangement 47, by means of which the clutch 3 is engaged and disengaged.

The control unit 45 is programmed in a known manner so that it keeps the clutch 3 engaged when the vehicle is standing still and the gear selector 46 is in the neutral position. This means that the engine drives the input shaft 7 and thus also the intermediate shaft, while the output shaft 34 is disengaged. An auxiliary unit, e.g. an oil pump for lubricating the gearbox, can possibly be driven by the intermediate shaft in this position. The control unit 45 is also programmed, when the vehicle is standing still and the gear selector is moved from the neutral position to a shift position, either to a position for automatic shifting or to a position with a start-off gear selected by the driver, to first release the clutch 3, then brake the intermediate shaft 11 to stop with the aid of the intermediate shaft brake 50, indicated in FIG. 2, which can be a brake device, which can be known per se, controlled by the control unit 45. With the intermediate shaft 11 braked to stop or at least nearly to stop, the control unit 45 now initiates the shift in the basic gearbox to a gear ratio which is provided by the automatic shifter or selected by the driver. When the driver, after engaging the gear, opens the throttle, the accelerator pedal functions as a reverse clutch pedal, which, via the control unit, gradually increases the clutch engagement with increasing throttle opening.

FIG. 3 illustrates schematically input which the second control unit 45 needs to be able to generate a computer simulation. With one control 300 for manual or automatic control parameter weighting, providing a driving criterion selected by the driver, the simulation can be controlled in the present invention. The driver can select to prioritize, for example, low fuel consumption (for economical driving, for example) constant vehicle speed (for rapid driving at high average speed, for example), a certain level of emissions (for environmentally friendly driving) or a combination (weighting) of said control parameters. For automatic control parameter weighting, a model stored in the second control unit is used, which takes into consideration various parameters such as throttle opening position, the mass of the vehicle. The weighting of the control parameters, is different for different gear speeds. For example, low fuel consumption has high priority for high gears, and a heavy vehicle driving uphill has a high weighting for average speed. The control 300 is adapted for communication with the second control unit 45. Pedal mappings 310, i.e, engine torque as a function of rpm for various throttle opening positions, are stored in the second control unit 45. An electronic map 320, for example stored on a CD-ROM (Compact Disc Read Only Memory) contains the information on a region's topography necessary for the computer simulation, i.e, at least gradients or elevation values for the route, with sea level as a reference, for example, and any information concerning speed limits along the route. The computer simulation uses parameters 330 sent from meters and sensors 360, in accordance with known technology. These consist at least of vehicle or train weight, instantaneous vehicle speed, gear ratios, degrees of efficiency, engine rpm, throttle opening position (even throttle opening position change), instantaneous position, road incline (not from electronic map), ambient temperature (which affects the fuel/air mixture), driving resistance and the engine dynamics of the engine. Driving resistance refers to a value computed by the second control unit in response to signals indicating instantaneous engine torque and instantaneous vehicle acceleration and mass, constituting an indication of road incline, any tailwind or headwind, and the rolling resistance of the vehicle. Furthermore, consideration can also be taken to information on the speed of the preceding vehicle. In the second control unit 45, there are engine models including steady-state torque, which is the torque which the engine can deliver steadily at a given operational point, i.e, where so-called transients to get to the operational point have been left out. With the necessary information, the second control unit 45 can compute (simulate over a certain, predetermined time) i.e, fuel consumption, average speed, and emissions (both exhaust and noise emissions), for a set of different gears and shifting schedules by solving equations with simulations and time increments. The best gear is selected by comparing computed fuel consumption, average speed, and emissions, or combinations of these, on the basis of a criterion selected by the driver, with matrices stored in the second control unit 45. Furthermore, FIG. 3 shows a symbol for GPS 350, which communicates with the second control unit, possibly also through the sensors 360. As an output from the second control unit 45, there is sent a decision 340, i.e, a gear selection.

FIG. 4 illustrates, in its most simple form, to simulate curves for a given traffic situation and a given vehicle state, i.e, where all of the parameters necessary for the computer simulation and the surrounding topography of the vehicle are known. The figure shows how the engine rpm, when shifting, is dependent on time or distance. The curve A (the solid line) represents a case after acceleration when shifting is effected at P1 from third gear to fourth gear. At the break in driving force after the shifting, the engine rpm drops but increases after a certain period again when the gear is engaged and acceleration takes over. The engine rpm once again increases and there is a new shifting from fourth gear to fifth gear at P3, whereafter the engine rpm again drops and increases again after a certain period. Curve B (the dashed line) represents another shifting sequence but for the same given traffic situation and vehicle state. In this case, a shifting at P2 from third gear directly to fifth gear is simulated. The result of such a shifting sequence will be, as according to the given example, that the latter case according to the simulation model will provide a higher rpm at P4. Thus, driving along the route will have been tested or "gamed out" for two different shifting strategies—one of which (curve B) consists of a single combination of engine speed and shift sequence (from third gear directly to fifth gear) and the other of which (curve A) consists of two different combinations of engine speed and shift sequence (one shift sequence being from third to fourth gear and the second shift sequence being from fourth to fifth gear)—and estimated fuel consumption, emissions, and the like are computed in this example for both cases. Depending on which engine rpm and which criterion for driving has been selected, a decision on the shifting schedule, to optimally fulfill the desired criterion, is made in the second control unit 45.

The invention claimed is:

1. A method for optimizing the shifting of transmission gears (gear ratios) in a motor vehicle for a given route along which the motor vehicle is being driven, comprising:

conducting a plurality of simulations of driving the motor vehicle along the given route for a period of time extending into the future, wherein a different, non-previously-assigned or non-previously-fixed gear-shifting strategy comprising one or more combinations of engine speed and from/to gear-shift sequence according to which the motor vehicle potentially could be operated while being driven along the given route for the period of time extending into the future is tested or gamed out in each of the simulations;

selecting from among the various gear-shifting strategies that have been tested or gamed out one which is specifically tailored to the given route to optimize a preselected driving-related criterion; and implementing the selected gear-shifting strategy while the motor vehicle is being driven along the given route.

2. The method of claim 1, wherein at least one of the various gear-shifting strategies that are tested or gamed out includes a non-sequential skip-shifting sequence in which one or more transmission gears are skipped.

3. The method of claim 1, wherein a current position of the motor vehicle is determined using the Global Positioning System (GPS) satellite system and is used in conducting the simulations.

4. The method of claim 1, wherein electronic map data, which includes topographical information, is used in conducting the simulations.

5. The method of claim 1, wherein the driving-related criterion is selected by a controller.

6. The method of claim 1, wherein the driving-related criterion is selected by a driver of the motor vehicle.

7. The method of claim 1, wherein the driving-related criterion is based on fuel consumption (gas mileage).

8. The method of claim 1, wherein the driving-related criterion is based on vehicle velocity.

9. The method of claim 1, wherein the driving-related criterion is based on vehicle emissions.

10. The method of claim 1, wherein the driving-related criterion is based on a weighted combination of driving-related parameters.

11. The method of claim 10, wherein the driving-related parameters comprise two or more parameters selected from the group consisting of fuel consumption (gas mileage), vehicle velocity, and vehicle emissions.

12. The method of claim 1, wherein a stored engine model is used to conduct the simulations.

13. The method of claim 12, wherein the engine model includes information pertaining to vehicle emissions at various transients.

14. The method of claim 12, wherein the engine model includes information pertaining to engine torque.

* * * * *